United States Patent
Holzer et al.

(10) Patent No.: US 12,211,272 B2
(45) Date of Patent: *Jan. 28, 2025

(54) MULTI-VIEW VISUAL DATA DAMAGE DETECTION

(71) Applicant: Fyusion, Inc., San Francisco, CA (US)

(72) Inventors: Stefan Johannes Josef Holzer, San Mateo, CA (US); Matteo Munaro, San Francisco, CA (US); Pavel Hanchar, Minsk (BY); Rodrigo Ortiz-Cayon, San Francisco, CA (US); Aidas Liaudanskas, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,820

(22) Filed: Nov. 16, 2023

(65) Prior Publication Data

US 2024/0096094 A1    Mar. 21, 2024

Related U.S. Application Data

(63) Continuation of application No. 17/525,657, filed on Nov. 12, 2021, now Pat. No. 11,861,900.
(Continued)

(51) Int. Cl.
| | | |
|---|---|---|
| *G06V 20/00* | (2022.01) | |
| *G06N 3/08* | (2023.01) | |
| *G06Q 10/20* | (2023.01) | |
| *G06T 7/00* | (2017.01) | |
| *G06V 20/20* | (2022.01) | |

(Continued)

(52) U.S. Cl.
CPC ............... *G06V 20/20* (2022.01); *G06N 3/08* (2013.01); *G06Q 10/20* (2013.01); *G06T 7/0002* (2013.01); *H04N 23/631* (2023.01); *H04N 23/64* (2023.01); *G06T 2200/24* (2013.01); *G06T 2207/20084* (2013.01)

(58) Field of Classification Search
None
See application file for complete search history.

(56) References Cited

U.S. PATENT DOCUMENTS

| | | |
|---|---|---|
| 5,956,081 A | 9/1999 | Katz |
| 6,747,687 B1 | 6/2004 | Alves |

(Continued)

FOREIGN PATENT DOCUMENTS

WO    2021001337 A1    1/2021

OTHER PUBLICATIONS

International Search Report and Written Opinion for App. No. PCT/US2021/059222, dated Feb. 24, 2022, 10 pages.
(Continued)

*Primary Examiner* — Martin Mushambo
(74) *Attorney, Agent, or Firm* — Kwan & Olynick LLP

(57) ABSTRACT

Images of an object may be captured via a camera at a mobile computing device at different viewpoints. The images may be used to identify components of the object and to identify damage estimates estimating damage to some or all of the components. Capture coverage levels corresponding with the components may be determined, and then recording guidance may be provided for capturing additional images to increase the capture coverage levels.

20 Claims, 20 Drawing Sheets
(10 of 20 Drawing Sheet(s) Filed in Color)

Related U.S. Application Data

(60) Provisional application No. 63/114,944, filed on Nov. 17, 2020.

(51) Int. Cl.
*H04N 23/60* (2023.01)
*H04N 23/63* (2023.01)

(56) References Cited

U.S. PATENT DOCUMENTS

| | | | |
|---|---|---|---|
| 7,920,959 | B1 | 4/2011 | Williams |
| 9,218,698 | B2 | 12/2015 | Ricci |
| 9,495,764 | B1 | 11/2016 | Boardman |
| 9,886,771 | B1 | 2/2018 | Chen |
| 10,319,094 | B1* | 6/2019 | Chen .................. G06N 3/08 |
| 10,373,260 | B1 | 8/2019 | Haller, Jr. |
| 10,497,108 | B1 | 12/2019 | Knuffman |
| 2002/0186300 | A1 | 12/2002 | Hudson |
| 2010/0056221 | A1 | 3/2010 | Park |
| 2011/0262028 | A1 | 10/2011 | Lipson |
| 2011/0313936 | A1 | 12/2011 | Sieger |
| 2016/0283074 | A1 | 9/2016 | Drive |
| 2017/0132835 | A1 | 5/2017 | Halliday |
| 2018/0260793 | A1* | 9/2018 | Li .................. G06Q 40/08 |
| 2018/0293664 | A1* | 10/2018 | Zhang .................. G06V 10/82 |
| 2019/0095877 | A1 | 3/2019 | Li |
| 2019/0096057 | A1 | 3/2019 | Allen |
| 2019/0098214 | A1 | 3/2019 | Kurosawa |
| 2019/0135216 | A1 | 5/2019 | Church |
| 2019/0189007 | A1 | 6/2019 | Herman |
| 2019/0335156 | A1 | 10/2019 | Rusu |
| 2020/0050890 | A1 | 2/2020 | Aizawa |
| 2020/0111203 | A1 | 4/2020 | Tan |
| 2020/0234488 | A1 | 7/2020 | Holzer |
| 2020/0257862 | A1* | 8/2020 | Kar .................. G06F 40/30 |
| 2020/0349757 | A1* | 11/2020 | Holzer .................. G06T 17/20 |
| 2021/0176435 | A1 | 6/2021 | Krüger |
| 2021/0342997 | A1* | 11/2021 | Malreddy .................. G06T 7/70 |

OTHER PUBLICATIONS

International Search Report and Written Opinion for App. No. PCT/US2021/059232, dated Mar. 7, 2022, 9 pages.

Office Action (Non-Final Rejection) dated Mar. 2, 2023 for U.S. Appl. No. 17/525,657 (pp. 1-12).

Office Action (Notice of Allowance and Fees Due (PTOL-85)) dated Aug. 21, 2023 for U.S. Appl. No. 17/525,657 (pp. 1-7).

International Search Report and Written Opinion issued in App. No. PCT/US2022/070489, mailing date Apr. 26, 2022, 11 pages.

Office Action (Non-Final Rejection) dated Sep. 20, 2022 for U.S. Appl. No. 17/525,683 (pp. 1-14).

Office Action (Final Rejection) dated Mar. 10, 2023 for U.S. Appl. No. 17/525,683 (pp. 1-15).

International Preliminary Report on Patentability issued in App. No. PCT/US2021/059222, mailing date Jun. 1, 2023, 6 pages.

International Preliminary Report on Patentability issued in App. No. PCT/US2021/059232, mailing date Jun. 1, 2023, 6 pages.

Office Action (Non-Final Rejection) dated Aug. 18, 2023 for U.S. Appl. No. 17/525,683 (pp. 1-14).

Office Action (Final Rejection) dated Jan. 9, 2024 for U.S. Appl. No. 17/525,683 (pp. 1-14).

* cited by examiner

MULTI-VIEW VISUAL DATA DAMAGE DETECTION

CROSS-REFERENCE TO RELATED APPLICATIONS

This application is a continuation of U.S. patent application Ser. No. 17/525,657, filed by Holzer et al. on Nov. 12, 2021, which claims priority to provisional U.S. Patent Application 63/114,944, filed by Holzer et al. on Nov. 17, 2020, which are hereby incorporated by reference in their entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to the capture and presentation of image data of an object, and more specifically to detecting damage to objects.

DESCRIPTION OF RELATED ART

Vehicles need to be inspected for damage on different occasions. For example, a vehicle may be inspected after an accident to evaluate or support an insurance claim or police report. As another example, a vehicle may be inspected before and after the rental of a vehicle, or before buying or selling a vehicle.

Vehicle inspection using conventional approaches is a largely manual process. Typically, a person walks around the vehicle and manually notes damage and conditions. This process is time-intensive, resulting in significant costs. The manual inspection results also vary based on the person. For example, a person may be more or less experienced in evaluating damage. The variation in results can yield a lack of trust and potential financial losses, for example when buying and selling vehicles or when evaluating insurance claims.

OVERVIEW

Techniques and mechanisms described herein relate generally to methods, systems, devices, and computer readable media having instructions stored thereon for performing object damage detection based on visual data. According to various embodiments, a first one or more images of an object may be captured via a camera at a mobile computing device. Each of the first one or more images may be captured from a respective viewpoint. A plurality of object components may be identified based on the first one or more images via a processor at the mobile computing device. A plurality of damage estimates estimating damage to a subset of the first plurality of object components may be identified based on the first one or more images. A plurality of capture coverage levels corresponding with the plurality of object components may be determined based on the first one or more images. A graphical user interface depicting the identified damage providing recording guidance for capturing a second one or more images of the object to increase one or more of the capture coverage levels may be presented on a display screen.

In some embodiments, the second one or more images of the object may be captured, and one or more of the damage estimates may be updated based on the second one or more images. The graphical user interface may be updated based on the updated damage estimates. The graphical user interface may include an indication of some or all of the plurality of capture coverage levels.

According to various embodiments, the graphical user interface may include a live camera view captured from the camera at the mobile computing device. The graphical user interface may include component segmentation information identifying some or all of the plurality of object components overlain on the live camera view. The graphical user interface may include an abstract diagram of the object having areas corresponding with some or all of the plurality of object components overlain on the live camera view.

According to various embodiments, the component segmentation information may include areas of overlayed color corresponding with some or all of the plurality of object components. In some embodiments, the graphical user interface may include component segmentation information identifying some or all of the plurality of object components overlain on the abstract diagram. The abstract diagram may present a flattened top-down view of the object.

According to various embodiments, a neural network may be applied to one or more images. The neural network may be capable of identifying the plurality of object components in one or more images. The neural network may be capable of identifying a plurality of damage estimates in one or more images.

BRIEF DESCRIPTION OF DRAWINGS

The patent or application file contains at least one drawing executed in color. Copies of this patent or patent application publication with color drawing(s) will be provided by the Office upon request and payment of the necessary fee.

The included drawings are for illustrative purposes and serve only to provide examples of possible structures and operations for the disclosed inventive systems, apparatus, methods and computer program products for image processing. These drawings in no way limit any changes in form and detail that may be made by one skilled in the art without departing from the spirit and scope of the disclosed implementations.

TECHNICAL DESCRIPTION

According to various embodiments, techniques and mechanisms described herein may be used to identify and represent damage to an object such as a vehicle. The damage detection techniques may be employed by untrained individuals. For example, an individual may collect multi-view data of an object, and the system may detect the damage automatically.

According to various embodiments, various types of damage may be detected. For a vehicle, such data may include, but is not limited to: scratches, dents, flat tires, cracked glass, broken glass, or other such damage.

In some implementations, a user may be guided to collect multi-view data in a manner that reflects the damage detection process. For example, when the system detects that damage may be present, the system may guide the user to take additional images of the portion of the object that is damaged.

According to various embodiments, techniques and mechanisms described herein may be used to create damage estimates that are consistent over multiple captures. In this way, damage estimates may be constructed in a manner that is independent of the individual wielding the camera and does not depend on the individual's expertise. In this way, the system can automatically detect damage in an instant, without requiring human intervention.

Although various techniques and mechanisms are described herein by way of example with reference to detecting damage to vehicles, these techniques and mechanisms are widely applicable to detecting damage to a range of objects. Such objects may include, but are not limited to: houses, apartments, hotel rooms, real property, personal property, equipment, jewelry, furniture, offices, people, and animals.

Figure 1:
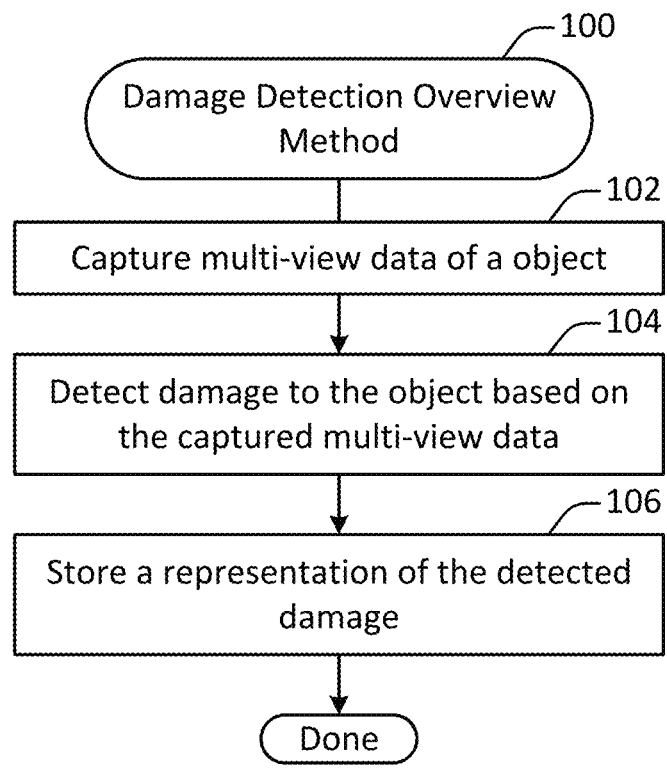
FIG. 1 illustrates a method for damage detection, performed in accordance with one or more embodiments.

FIG. 1 illustrates a method 100 for damage detection, performed in accordance with one or more embodiments. According to various embodiments, the method 100 may be performed at a mobile computing device such as a smart phone. The smart phone may be in communication with a remote server. Alternately, or additionally, some or all of the method 100 may be performed at a remote computing device such as a server. The method 100 may be used to detect damage to any of various types of objects. However, for the purpose of illustration, many examples discussed herein will be described with reference to vehicles.

At 102, multi-view data of an object is captured. According to various embodiments, the multi-view data may include images captured from different viewpoints. For example, a user may walk around a vehicle and capture images from different angles. In some configurations, the multi-view data may include data from various types of sensors. For example, the multi-view data may include data from more than one camera. As another example, the multi-view data may include data from a depth sensor. As another example, the multi-view data may include data collected from an inertial measurement unit (IMU). IMU data may include position information, acceleration information, rotation information, or other such data collected from one or more accelerometers or gyroscopes.

In particular embodiments, the multi-view data may be aggregated to construct a multi-view representation. Additional details regarding multi-view data and damage detection are discussed in U.S. Pat. No. 10,950,033, "DAMAGE DETECTION FROM MULTI-VIEW VISUAL DATA", by Holzer et al., filed Nov. 22, 2019, which is hereby incorporated by reference in its entirety and for all purposes.

At 104, damage to the object is detected based on the captured multi-view data. In some implementations, the damage may be detected by evaluating some or all of the multi-view data with a neural network, by comparing some or all of the multi-view data with reference data, and/or any other relevant operations for damage detection. Additional details regarding damage detection are discussed throughout the application.

At 106, a representation of the detected damage is stored on a storage medium or transmitted via a network. According to various embodiments, the representation may include some or all of a variety of information. For example, the representation may include an estimated dollar value. As another example, the representation may include a visual depiction of the damage. As still another example, a list of damaged parts may be provided. Alternatively, or additionally, the damaged parts may be highlighted in a 3D CAD model.

In some embodiments, a visual depiction of the damage may include an image of actual damage. For example, once the damage is identified at 104, one or more portions of the multi-view data that include images of the damaged portion of the object may be selected and/or cropped.

In some implementations, a visual depiction of the damage may include an abstract rendering of the damage. An abstract rendering may include a heatmap that shows the probability and/or severity of damage using a color scale. Alternatively, or additionally, an abstract rendering may represent damage using a top-down view or other transformation. By presenting damage on a visual transformation of the object, damage (or lack thereof) to different sides of the object may be presented in a standardized manner.

Figure 2:
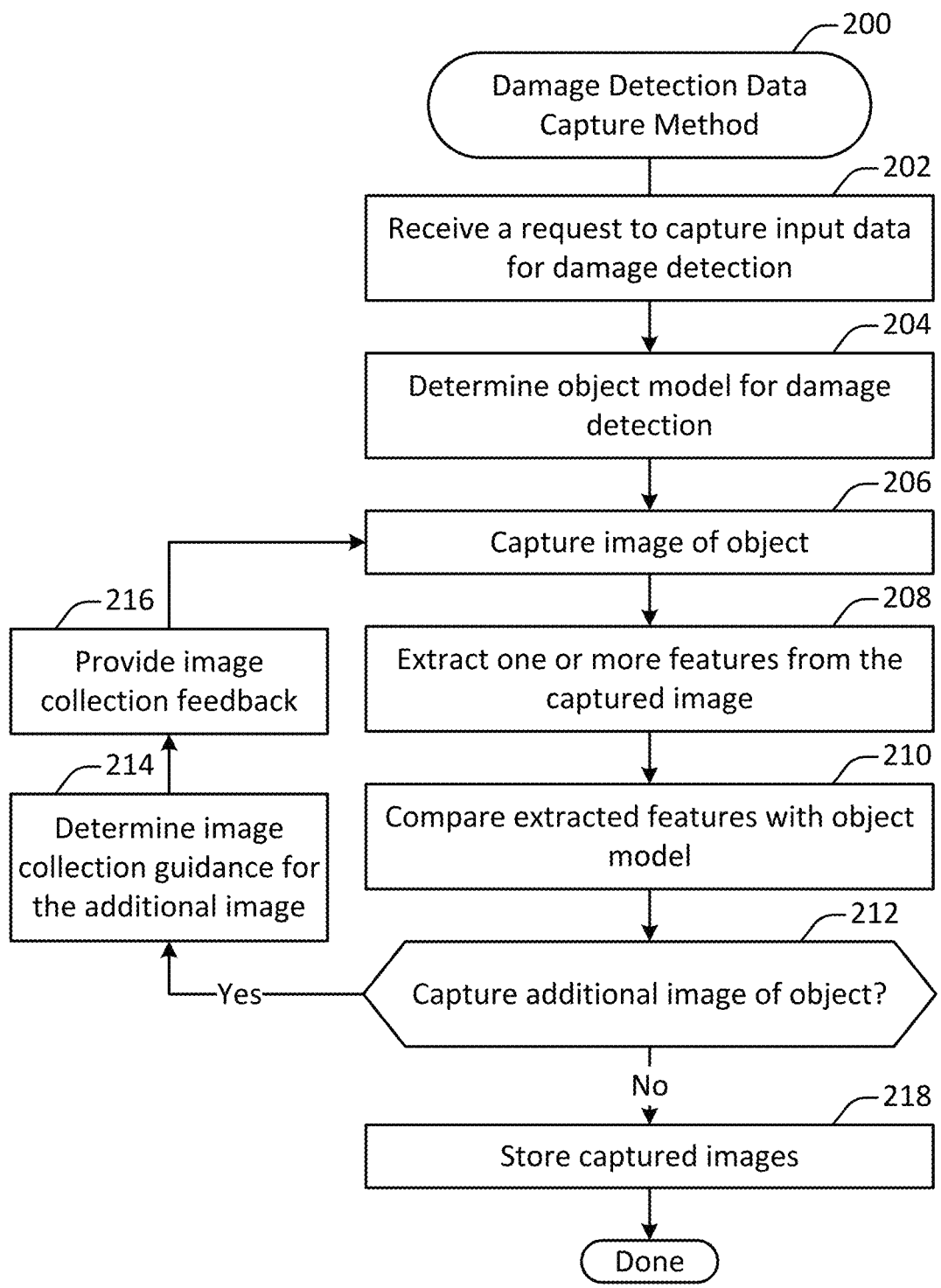
FIG. 2 illustrates a method of damage detection data capture, performed in accordance with one or more embodiments.

FIG. 2 illustrates a method 200 of damage detection data capture, performed in accordance with one or more embodiments. According to various embodiments, the method 200 may be performed at a mobile computing device such as a smart phone. The smart phone may be in communication with a remote server. The method 200 may be used to detect damage to any of various types of objects. However, for the purpose of illustration, many examples discussed herein will be described with reference to vehicles.

A request to capture input data for damage detection for an object is received at 202. In some implementations, the request to capture input data may be received at a mobile computing device such as a smart phone. In particular embodiments, the object may be a vehicle such as a car, truck, or sports utility vehicle.

An object model for damage detection is determined at 204. According to various embodiments, the object model may include reference data for use in evaluating damage and/or collecting images of an object. For example, the object model may include one or more reference images of similar objects for comparison. As another example, the object model may include a trained neural network. As yet another example, the object model may include one or more reference images of the same object captured at an earlier point in time. As yet another example, the object model may include a 3D model (such as a CAD model) or a 3D mesh reconstruction of the corresponding vehicle.

In some embodiments, the object model may be determined based on user input. For example, the user may identify a vehicle in general or a car, truck, or sports utility vehicle in particular as the object type.

In some implementations, the object model may be determined automatically based on data captured as part of the method 200. In this case, the object model may be determined after the capturing of one or more images at 206.

At 206, an image of the object is captured. According to various embodiments, capturing the image of the object may involve receiving data from one or more of various sensors. Such sensors may include, but are not limited to, one or more cameras, depth sensors, accelerometers, and/or gyroscopes. The sensor data may include, but is not limited to, visual data, motion data, and/or orientation data. In some configurations, more than one image of the object may be captured. Alternatively, or additionally, video footage may be captured.

According to various embodiments, a camera or other sensor located at a computing device may be communicably coupled with the computing device in any of various ways. For example, in the case of a mobile phone or laptop, the camera may be physically located within the computing device. As another example, in some configurations a camera or other sensor may be connected to the computing device via a cable. As still another example, a camera or other sensor may be in communication with the computing device via a wired or wireless communication link.

According to various embodiments, as used herein the term "depth sensor" may be used to refer to any of a variety of sensor types that may be used to determine depth information. For example, a depth sensor may include a projector and camera operating in infrared light frequencies. As another example, a depth sensor may include a projector and camera operating in visible light frequencies. For instance, a line-laser or light pattern projector may project a visible light pattern onto an object or surface, which may then be detected by a visible light camera.

One or more features of the captured image or images are extracted at 208. In some implementations, extracting one or more features of the object may involve constructing a multi-view capture that presents the object from different viewpoints. If a multi-view capture has already been constructed, then the multi-view capture may be updated based on the new image or images captured at 206. Alternatively, or additionally, feature extraction may involve performing one or more operations such as object recognition, component identification, orientation detection, or other such steps.

At 210, the extracted features are compared with the object model. According to various embodiments, comparing the extracted features to the object model may involve making any comparison suitable for determining whether the captured image or images are sufficient for performing damage comparison. Such operations may include, but are not limited to: applying a neural network to the captured image or images, comparing the captured image or images to one or more reference images, and/or performing any of the operations discussed with respect to FIGS. 3 and 4.

A determination is made at 212 as to whether to capture an additional image of the object. In some implementations, the determination may be made at least in part based on an analysis of the one or more images that have already been captured.

In some embodiments, a preliminary damage analysis may be implemented using as input the one or more images that have been captured. If the damage analysis is inconclusive, then an additional image may be captured. Techniques for conducting damage analysis are discussed in additional detail with respect to the methods 300 and 400 shown in FIGS. 3 and 4.

In some embodiments, the system may analyze the captured image or images to determine whether a sufficient portion of the object has been captured in sufficient detail to support damage analysis. For example, the system may analyze the capture image or images to determine whether the object is depicted from all sides. As another example, the system may analyze the capture image or images to determine whether each panel or portion of the object is shown in a sufficient amount of detail. As yet another example, the system may analyze the capture image or images to determine whether each panel or portion of the object is shown from a sufficient number of viewpoints.

If the determination is made to capture an additional image, then at 214 image collection guidance for capturing the additional image is determined. In some implementations, the image collection guidance may include any suitable instructions for capturing an additional image that may assist in changing the determination made at 212. Such guidance may include an indication to capture an additional image from a targeted viewpoint, to capture an additional image of a designated portion of the object, or to capture an additional image at a different level of clarity or detail. For example, if possible damage is detected, then feedback may be provided to capture additional detail at the damaged location.

At 216, image collection feedback is provided. According to various embodiments, the image collection feedback may include any suitable instructions or information for assisting a user in collecting additional images. Such guidance may include, but is not limited to, instructions to collect an image at a targeted camera position, orientation, or zoom level. Alternatively, or additionally, a user may be presented with instructions to capture a designated number of images or an image of a designated portion of the object.

For example, a user may be presented with a graphical guide to assist the user in capturing an additional image from a target perspective. As another example, a user may be presented with written or verbal instructions to guide the user in capturing an additional image.

When it is determined to not capture an additional image of the object, then at 218 the captured image or images are stored. In some implementations, the captured images may be stored on a storage device and used to perform damage detection, as discussed with respect to the methods 300 and 400 in FIGS. 3 and 4. Alternatively, or additionally, the images may be transmitted to a remote location via a network interface.

Figure 3:
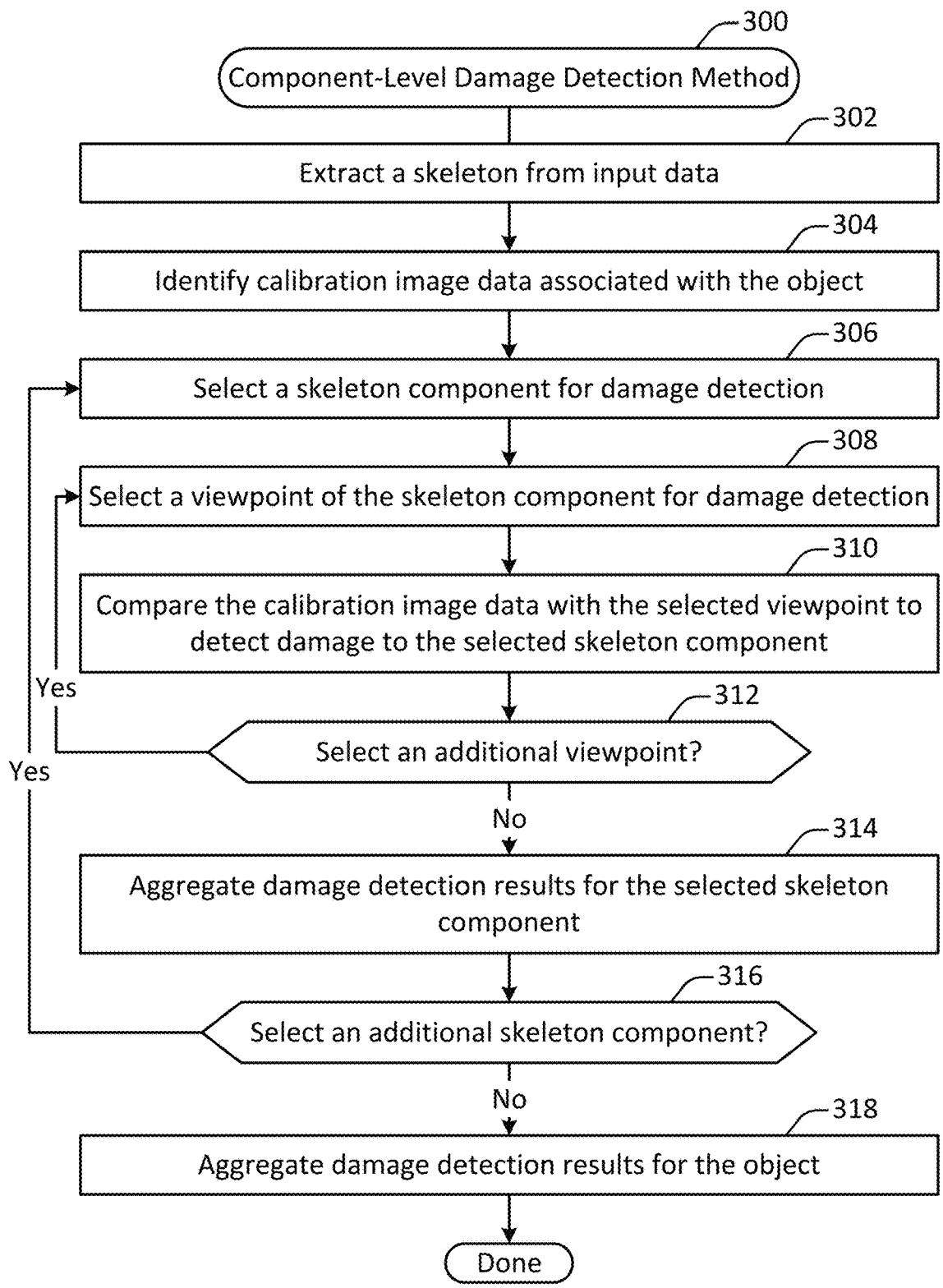
FIG. 3 illustrates a method for component-level damage detection, performed in accordance with one or more embodiments.

FIG. 3 illustrates a method 300 for component-level damage detection, performed in accordance with one or more embodiments. According to various embodiments, the method 300 may be performed at a mobile computing device such as a smart phone. The smart phone may be in communication with a remote server. The method 300 may be used to detect damage to any of various types of objects. However, for the purpose of illustration, many examples discussed herein will be described with reference to vehicles.

A skeleton is extracted from input data at 302. According to various embodiments, a skeleton may refer to a three-dimensional or two-dimensional mesh. The input data may include visual data collected as discussed with respect to the method 300 shown in FIG. 3. Alternatively, or additionally, the input data may include previously collected visual data, such as visual data collected without the use of recording guidance.

In some implementations, the input data may include one or more images of the object captured from different perspectives. Alternatively, or additionally, the input data may include video data of the object. In addition to visual data, the input data may also include other types of data, such as IMU data.

According to various embodiments, skeleton detection may involve one or more of a variety of techniques. Such techniques may include, but are not limited to: 2D skeleton detection using machine learning, 3D pose estimation, and 3D reconstruction of a skeleton from one or more 2D skeletons and/or poses.

Calibration image data associated with the object is identified at 304. According to various embodiments, the calibration image data may include one or more reference images of similar objects or of the same object at an earlier point in time. Alternatively, or additionally, the calibration image data may include a neural network used to identify damage to the object.

A skeleton component is selected for damage detection at 306. In some implementations, a skeleton component may represent a panel of the object. In the case of a vehicle, for example, a skeleton component may represent a door panel, a window, or a headlight. Skeleton components may be selected in any suitable order, such as sequentially, randomly, in parallel, or by location on the object.

According to various embodiments, when a skeleton component is selected for damage detection, a multi-view capture of the skeleton component may be constructed. Constructing a multi-view capture of the skeleton component may involve identifying different images in the input data that capture the skeleton component from different viewpoints. The identified images may then be selected, cropped, and combined to produce a multi-view capture specific to the skeleton component.

A viewpoint of the skeleton component is selected for damage detection at 304. In some implementations, each viewpoint included in the multi-view capture of the skeleton component may be analyzed independently. Alternatively, or additionally, more than one viewpoint may be analyzed simultaneously, for instance by providing the different viewpoints as input data to a machine learning model trained to identify damage to the object. In particular embodiments, the input data may include other types of data, such as 3D visual data or data captured using a depth sensor or other type of sensor.

According to various embodiments, one or more alternatives to skeleton analysis at 302-310 may be used. For example, an object part (e.g., vehicle component) detector may be used to directly estimate the object parts. As another example, an algorithm such as a neural network may be used to map an input image to a top-down view of an object such as a vehicle (and vice versa) in which the components are defined. As yet another example, an algorithm such as a neural network that classifies the pixels of an input image as a specific component can be used to identify the components. As still another example, component-level detectors may be used to identify specific components of the object. As yet another alternative, a 3D reconstruction of the vehicle may be computed and a component classification algorithm may be run on that 3D model. The resulting classification can then be back-projected into each image. As still another alternative, a 3D reconstruction of the vehicle can be computed and fitted to an existing 3D CAD model of the vehicle in order to identify the single components.

At 310, the calibration image data is compared with the selected viewpoint to detect damage to the selected skeleton component. According to various embodiments, the comparison may involve applying a neural network to the input data. Alternatively, or additionally, an image comparison between the selected viewpoint and one or more reference images of the object captured at an earlier point in time may be performed.

A determination is made at 312 as to whether to select an additional viewpoint for analysis. According to various embodiments, additional viewpoints may be selected until all available viewpoints are analyzed. Alternatively, viewpoints may be selected until the probability of damage to the selected skeleton component has been identified to a designated degree of certainty.

Damage detection results for the selected skeleton component are aggregated at 314. According to various embodiments, damage detection results from different viewpoints to a single damage detection result per panel resulting in a damage result for the skeleton component. For example, a heatmap may be created that shows the probability and/or severity of damage to a vehicle panel such as a vehicle door. According to various embodiments, various types of aggregation approaches may be used. For example, results determined at 310 for different viewpoints may be averaged. As another example, different results may be used to "vote" on a common representation such as a top-down view. Then, damage may be reported if the votes are sufficiently consistent for the panel or object portion.

A determination is made at 316 as to whether to select an additional skeleton component for analysis. In some implementations, additional skeleton components may be selected until all available skeleton components are analyzed.

Damage detection results for the object are aggregated at 314. According to various embodiments, damage detection results for different components may be aggregated into a single damage detection result for the object as a whole. For example, creating the aggregated damage results may involve creating a top-down view. As another example, creating the aggregated damage results may involve identifying standardized or appropriate viewpoints of portions of the object identified as damaged. As yet another example, creating the aggregated damage results may involve tagging damaged portions in a multi-view representation. As still another example, creating the aggregated damage results may involve overlaying a heatmap on a multi-view representation. As yet another example, creating the aggregated damage results may involve selecting affected parts and presenting them to the user. Presenting may be done as a list, as highlighted elements in a 3D CAD model, or in any other suitable fashion.

In particular embodiments, techniques and mechanisms described herein may involve a human to provide additional input. For example, a human may review damage results, resolve inconclusive damage detection results, or select damage result images to include in a presentation view. As another example, human review may be used to train one or more neural networks to ensure that the results computed are correct and are adjusted as necessary.

Figure 4:
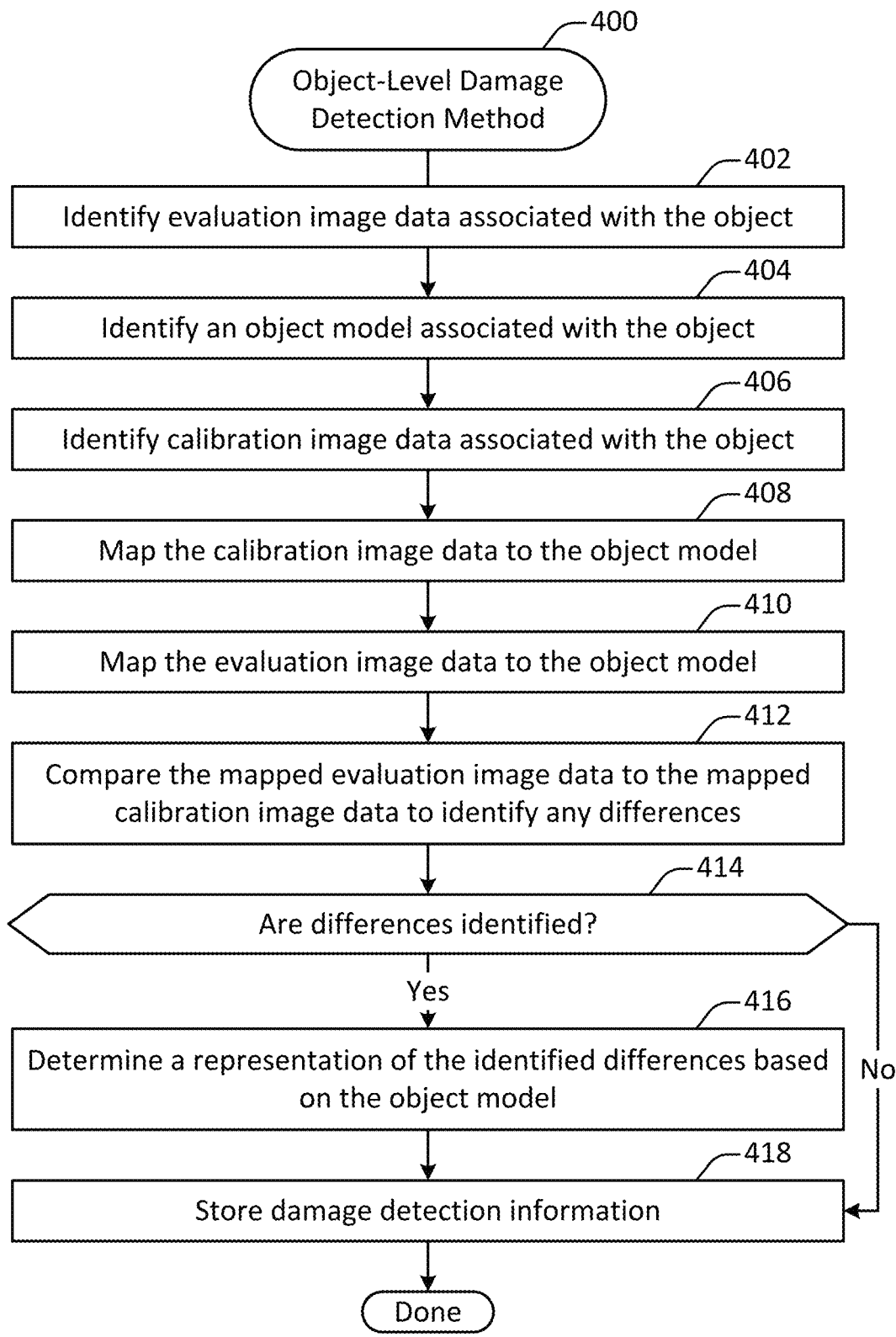
FIG. 4 illustrates an object-level damage detection method, performed in accordance with one or more embodiments.

FIG. 4 illustrates an object-level damage detection method 400, performed in accordance with one or more embodiments. The method 400 may be performed at a mobile computing device such as a smart phone. The smart phone may be in communication with a remote server. The method 400 may be used to detect damage to any of various types of objects.

Evaluation image data associated with the object is identified at 402. According to various embodiments, the evaluation image data may include single images captured from different viewpoints. As discussed herein, the single images may be aggregated into a multi-view capture, which may include data other than images, such as IMU data.

An object model associated with the object is identified at 404. In some implementations, the object model may include a 2D or 3D standardized mesh, model, or abstracted representation of the object. For instance, the evaluation image data may be analyzed to determine the type of object that is represented. Then, a standardized model for that type of object may be retrieved. Alternatively, or additionally, a user may select an object type or object model to use. The object model may include a top-down view of the object.

Calibration image data associated with the object is identified at 406. According to various embodiments, the calibration image data may include one or more reference images. The reference images may include one or more images of the object captured at an earlier point in time. Alternatively, or additionally, the reference images may include one or more images of similar objects. For example, a reference image may include an image of the same type of car as the car in the images being analyzed.

In some implementations, the calibration image data may include a neural network trained to identify damage. For instance, the calibration image data may be trained to analyze damage from the type of visual data included in the evaluation data.

The calibration data is mapped to the object model at 408. In some implementations, mapping the calibration data to the object model may involve mapping a perspective view of an object from the calibration images to a top-down view of the object.

The evaluation image data is mapped to the object model at 410. In some implementations, mapping the evaluation image data to the object model may involve determine a pixel-by-pixel correspondence between the pixels of the image data and the points in the object model. Performing such a mapping may involve determining the camera position and orientation for an image from IMU data associated with the image.

In some embodiments, a dense per-pixel mapping between an image and the top-down view may be estimated at 410. Alternatively, or additionally, location of center of an image may be estimated with respect to the top-down view. For example, a machine learning algorithm such as deep net may be used to map the image pixels to coordinates in the top-down view. As another example, joints of a 3D skeleton of the object may be estimated and used to define the mapping. As yet another example, component-level detectors may be used to identify specific components of the object.

In some embodiments, the location of one or more object parts within the image may be estimated. Those locations may then be used to map data from the images to the top-down view. For example, object parts may be classified on a pixel-wise basis. As another example, the center location of object parts may be determined. As another example, the joints of a 3D skeleton of an object may be estimated and used to define the mapping. As yet another example, component-level detectors may be used for specific object components.

In some implementations, images may be mapped in a batch via a neural network. For example, a neural network may receive as input a set of images of an object captured from different perspectives. The neural network may then detect damage to the object as a whole based on the set of input images.

The mapped evaluation image data is compared to the mapped calibration image data at 412 to identify any differences. According to various embodiments, the data may be compared by running a neural network on a multi-view representation as a whole. Alternatively, or additional, the evaluation and image data may be compared on an image-by-image basis.

If it is determined at 414 that differences are identified, then at 416 a representation of the identified differences is determined. According to various embodiments, the representation of the identified differences may involve a heatmap of the object as a whole. For example, a heatmap of a top-down view of a vehicle showing damage is illustrated in FIG. 2. Alternatively, one or more components that are damaged may be isolated and presented individually.

At 418, a representation of the detected damage is stored on a storage medium or transmitted via a network. In some implementations, the representation may include an estimated dollar value. Alternatively, or additionally, the representation may include a visual depiction of the damage. Alternatively, or additionally, affected parts may be presented as a list and/or highlighted in a 3D CAD model.

In particular embodiments, damage detection of an overall object representation may be combined with damage representation on one or more components of the object. For example, damage detection may be performed on a closeup of a component if an initial damage estimation indicates that damage to the component is likely.

Figure 5:
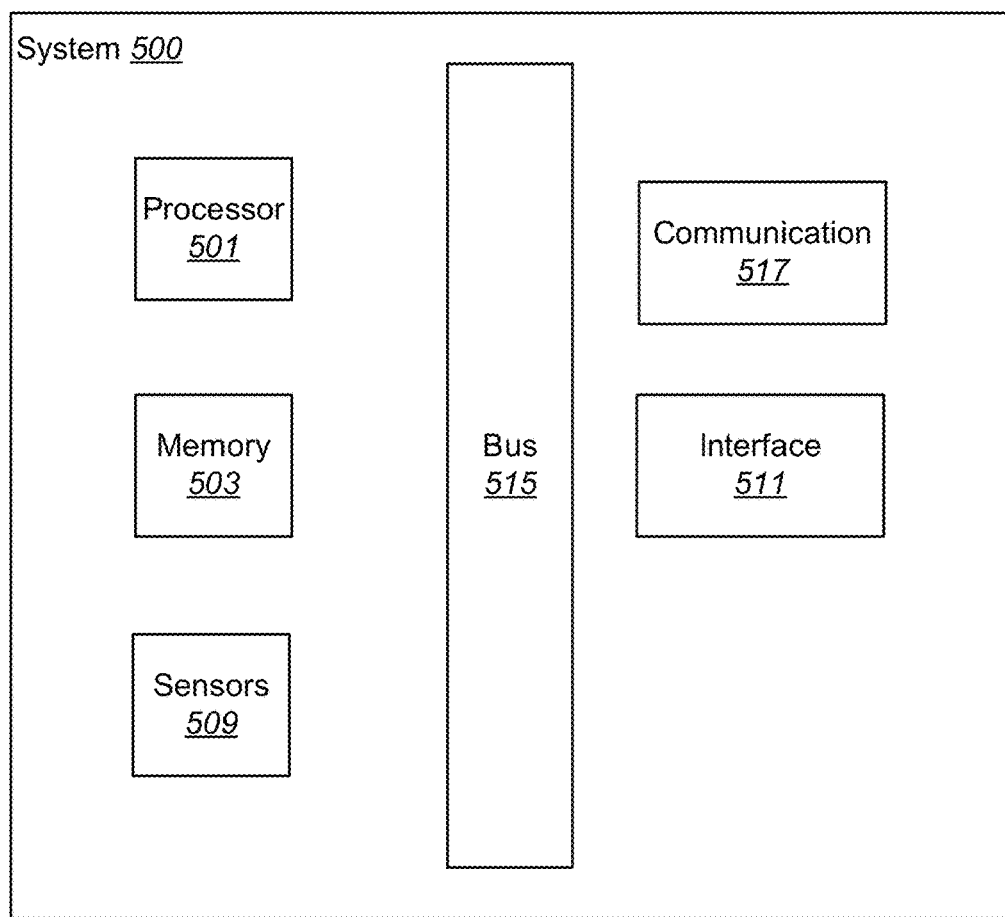
FIG. 5 illustrates a damage detection and presentation method, performed in accordance with one or more embodiments.

FIG. 5 illustrates a damage detection and presentation method 500, performed in accordance with one or more embodiments. In some embodiments, the method 500 may be used to capture image data, perform damage detection, and present information in a user interface as shown and described herein.

According to various embodiments, the method 500 may be used to guide a user through a capture process, for instance by showing information related to capture completeness and/or coverage levels. For example, damage detection may be performed at a remote location such as on a remote server or in a cloud computing environment. In such a configuration, the method 500 may be used to indicate whether enough images have been captured for a suitable analysis by a remote damage detection algorithm without requiring back and forth communication to capture additional data. As another example, the method 500 may be used to indicate whether enough images have been captured for a human to analyze the data remotely.

A request to perform damage detection for an object is received at 502. According to various embodiments, the request may be received at a mobile computing device that has a camera. For instance, the request may be received at an application configured to perform damage detect.

An image of the object is captured at 504. According to various embodiments, the image may be captured by pointing the camera at the object. The image may be captured manually or automatically. For example, an image may be captured by the application periodically, for instance at an interval of once per second. As another example, the user may provide user input indicating that an image should be captured. As yet another example, images may be captured continuously, for instance in a video feed.

In particular embodiments, images may be automatically captured in a way that is anticipated to increase one or more estimated parameter values. Examples of such estimated parameter values may include, but are not limited to: object coverage, damage estimate confidence, and image capture completeness. For example, object coverage may be determined based on the percentage of an object included in captured images. Accordingly, additional images of the object may be selected for capture to fill in one or more coverage gaps. As another example, damage estimate confidence may be based on characteristics such as light reflections, angles, detail level associated with captured images. Accordingly, additional images of the object may be selected for capture to provide for improved or additional lighting, covered angles, and/or detail for particular portions of the object for which damage detection confidence levels do not yet meet or exceed a designated threshold.

One or more components of the object are identified at 506. According to various embodiments, components may be identified as discussed with respect to the methods 200 and 300 shown in FIGS. 2 and 3.

A coverage level for each of the components is determined at 508. In some embodiments, the system may analyze the captured image or images to determine whether a sufficient portion of the object has been captured in sufficient detail to support damage analysis. For example, the system may analyze the capture image or images to determine whether the object is depicted with a sufficient level of detail from all sides. As another example, the system may analyze the capture image or images to determine whether each panel or portion of the object is shown in a sufficient amount of detail. As yet another example, the system may analyze the capture image or images to determine whether each panel or portion of the object is shown from a sufficient number of viewpoints.

Damage to the identified components is detected at 510. According to various embodiments, damage may be detected as discussed with respect to the method 400 shown in FIG. 4.

At 512, a user interface is updated based on the captured image. According to various embodiments, updating the user interface may include any or all of a variety of operations, as shown in FIGS. 7-20. For example, the captured image may be displayed in the user interface. As another example, a live camera view may be displayed in the user interface.

Figure 7:
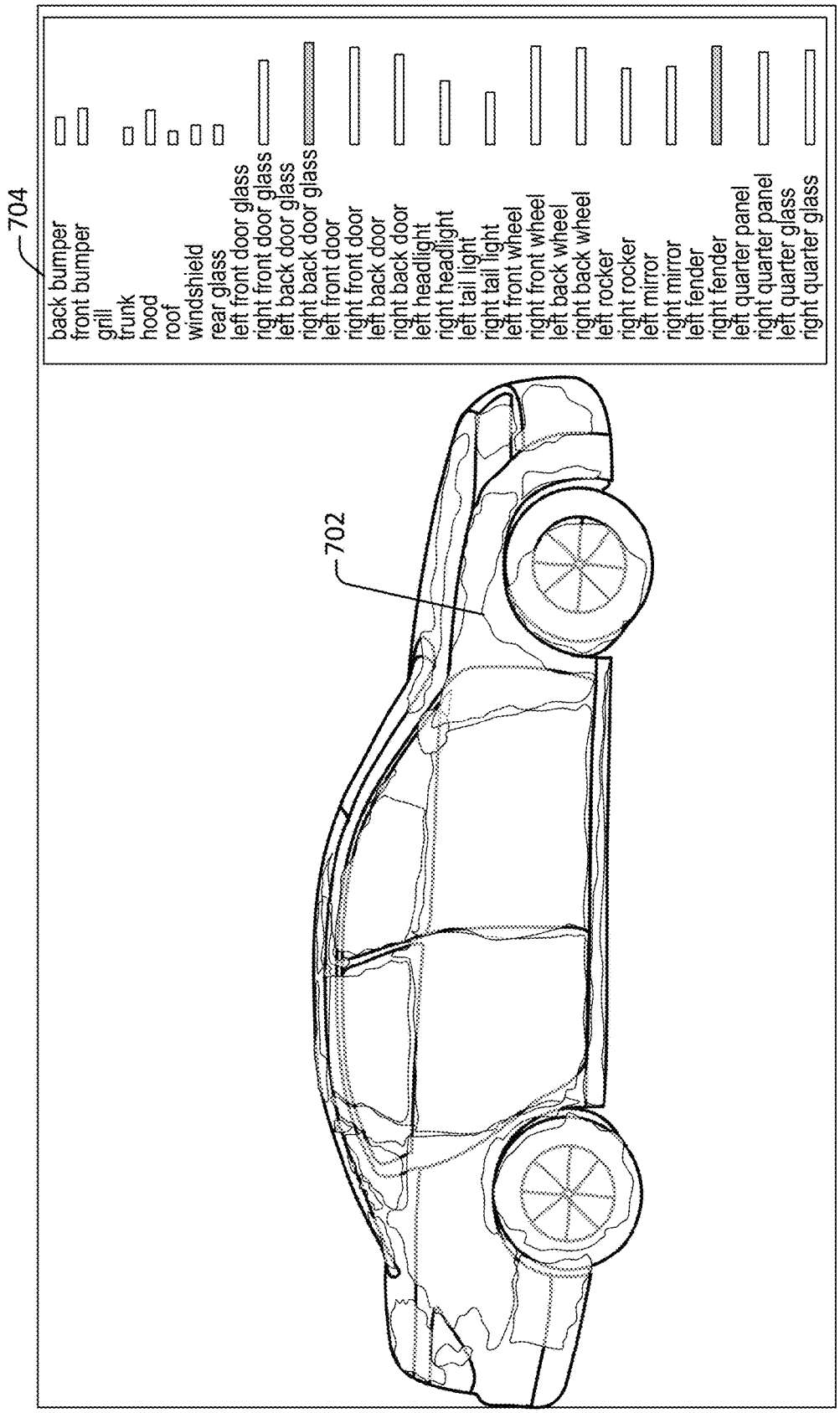
FIGS. 7-20 illustrate images presented in a user interface and illustrating the collection and aggregation of information from visual data.
Figure 9:
Figure 11:
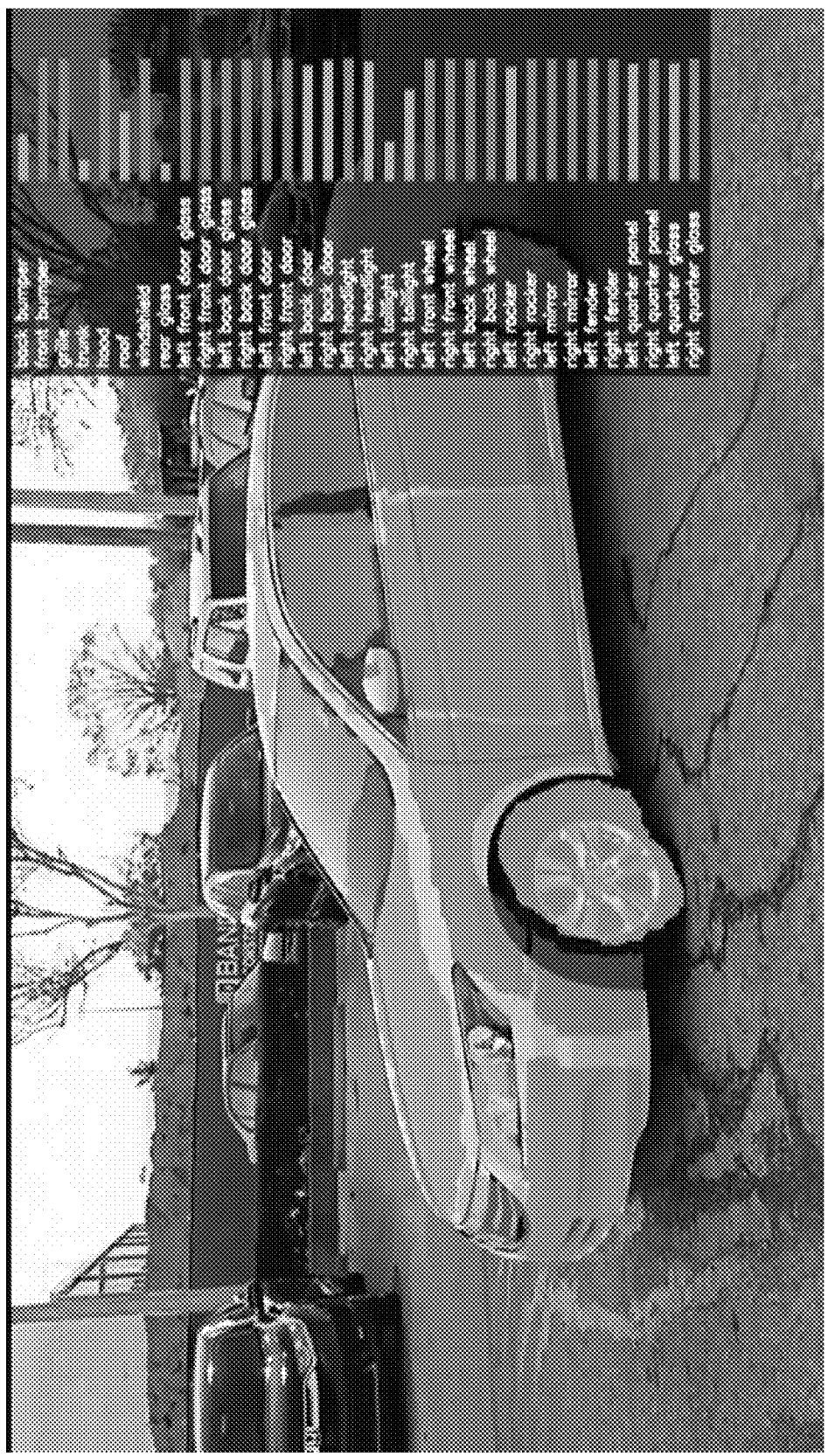

In some embodiments, one or more identified components may be highlighted in the user interface. For instance, as shown in FIG. 7, FIG. 9, and FIG. 11, a component overlay may be displayed overlain on the captured image or a live camera feed of the object. Such information may be presented using different colored panels (not shown).

In some embodiments, one or more component coverage levels may be displayed in the user interface at 704. For instance, a coverage level may be displayed as a status bar associated with a component, as shown in FIG. 7. Alternatively, or additionally, coverage levels may be displayed via a color overlay, for instance by highlighting in green objects that have inadequate coverage and highlighting in red those components that have inadequate coverage.

In some implementations, one or more coverage levels may be depicted in an object model. For instance, as shown in FIG. 7, portions of an object represented in a captured image may be depicted as colored points or regions, with different colors corresponding to different components. As shown in FIG. 9, capturing successive images may then result in the object model becoming solid as all external portions of the object are captured in an image.

In some embodiments, detected damage may be presented in a user interface. For example, detected damage may be presented as a heatmap. The heatmap may be shown as an overlay on an image of the object, on a live camera feed of the object, and/or on a model of the object such as a top-down view. For example, in FIG. 15 through FIG. 20, detected damage is shown as both a heatmap overlain on a live camera view and as a heatmap overlain on a top-down view of the object.

A determination is made at 514 as to whether to capture an additional image of the object. According to various embodiments, additional visual data may be captured until user input is received indicating that image capture should be terminated. Alternatively, or additionally, visual data may be captured until a determination is made that a coverage level for the object exceeds a designated threshold.

Figure 6:
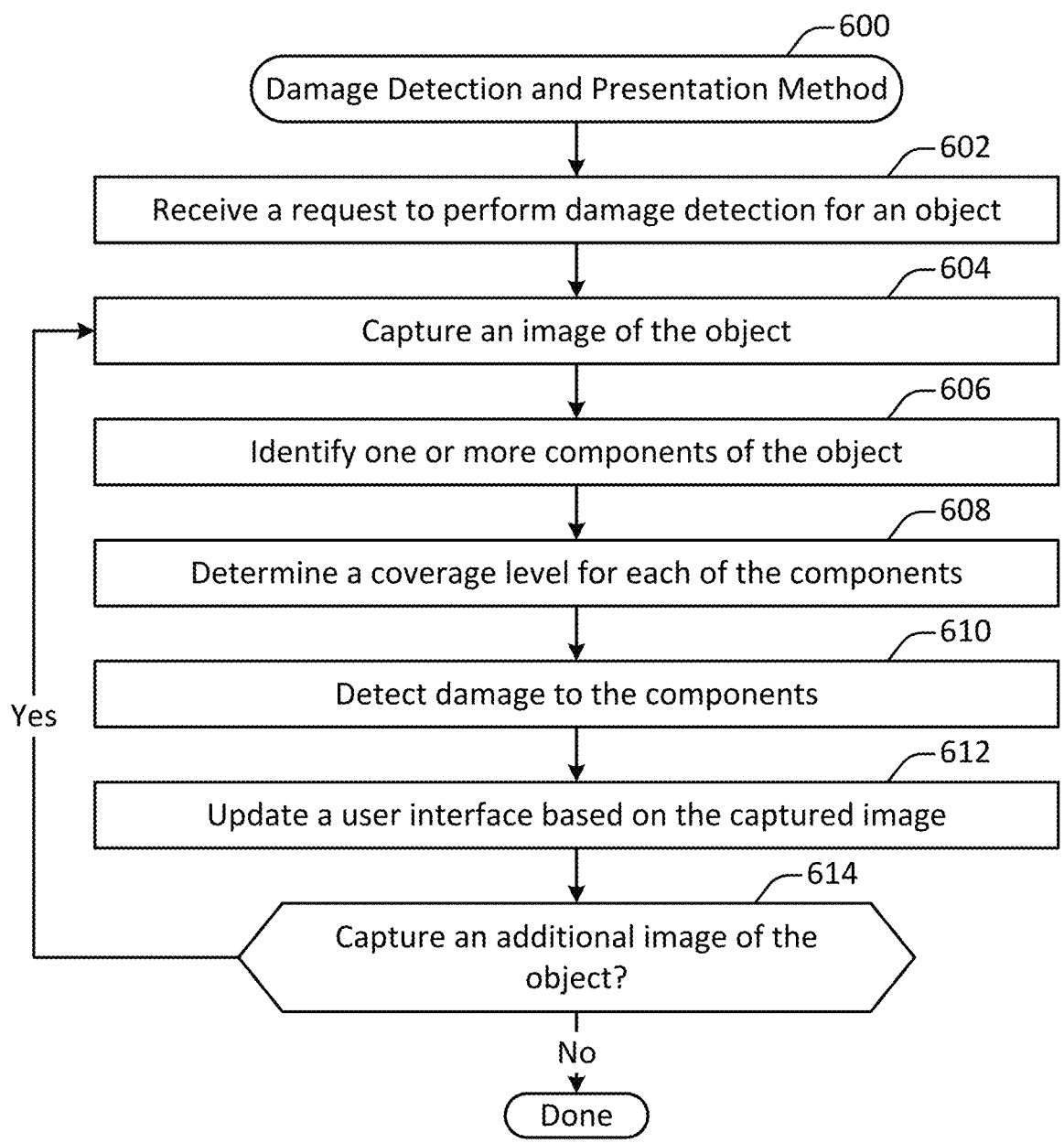
FIG. 6 illustrates a computer system configured in accordance with one or more embodiments.

FIG. 6 illustrates a computer system 600 configured in accordance with one or more embodiments. For instance, the computer system 600 can be used to provide MVIDMRs according to various embodiments described above. According to various embodiments, a system 600 suitable for implementing particular embodiments includes a processor 601, a memory 603, an interface 611, and a bus 615 (e.g., a PCI bus).

The system 600 can include one or more sensors 609, such as light sensors, accelerometers, gyroscopes, microphones, cameras including stereoscopic or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 5, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random-access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In some embodiments, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

The interface 611 may include separate input and output interfaces, or may be a unified interface supporting both operations. Examples of input and output interfaces can include displays, audio devices, cameras, touch screens, buttons and microphones. When acting under the control of appropriate software or firmware, the processor 601 is responsible for such tasks such as optimization. Various specially configured devices can also be used in place of a processor 601 or in addition to processor 601, such as graphical processor units (GPUs). The complete implementation can also be done in custom hardware. The interface 611 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 600 uses memory 603 to store data and program instructions and maintained a local side cache. The program instructions may control the operation of an operating system and/or one or more applications, for example. The memory or memories may also be configured to store received metadata and batch requested metadata.

The system 600 can be integrated into a single device with a common housing. For example, system 600 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 600 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a MVIDMR. In addition, a virtual guide can be provided to help teach a user how to view a MVIDMR in the wearable system. For example, the virtual guide can be provided in synthetic images output to head mounted display which indicate that the MVIDMR can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

FIGS. 7-20 illustrate images presented in a user interface and illustrating the collection and aggregation of information from visual data. In particular embodiments, the information may be used for detecting damage to an object. In various embodiments described herein, the object is referred to as being a vehicle. However, information about various types of objects may be captured.

In FIG. 7, a camera at a mobile computing device such as a mobile phone is pointed at the side of the vehicle. One or more images are captured. On the right, status bars corresponding to different portions of the vehicle are presented.

In some embodiments, a status bar illustrates a confidence level in a damage detection estimate corresponding to the identified components. For example, because the camera is focused on the right side of the vehicle but has not yet focused on the left side of the vehicle, the confidence level for the right quarter panel is high, while the confidence level for the left quarter panel is zero.

In some embodiments, a status bar illustrates a degree of coverage of an object or a portion of an object. For instance, a status bar may increase in value as image data of more of the object is captured. In particular embodiments, two or more status bars may be shown. For instance, one status bar may correspond to a confidence level, while another status bar may correspond to image data coverage.

In FIG. 7, different portions of the vehicle are shown with overlaying blocks of different colors. According to various embodiments, colors may be used to identify various types of information about the vehicle. For example, different colors may correspond with different vehicle components, different degrees of image data coverage, different degrees of image data completeness, and/or different confidence levels related to an estimated value such as detected damage.

Figure 8:
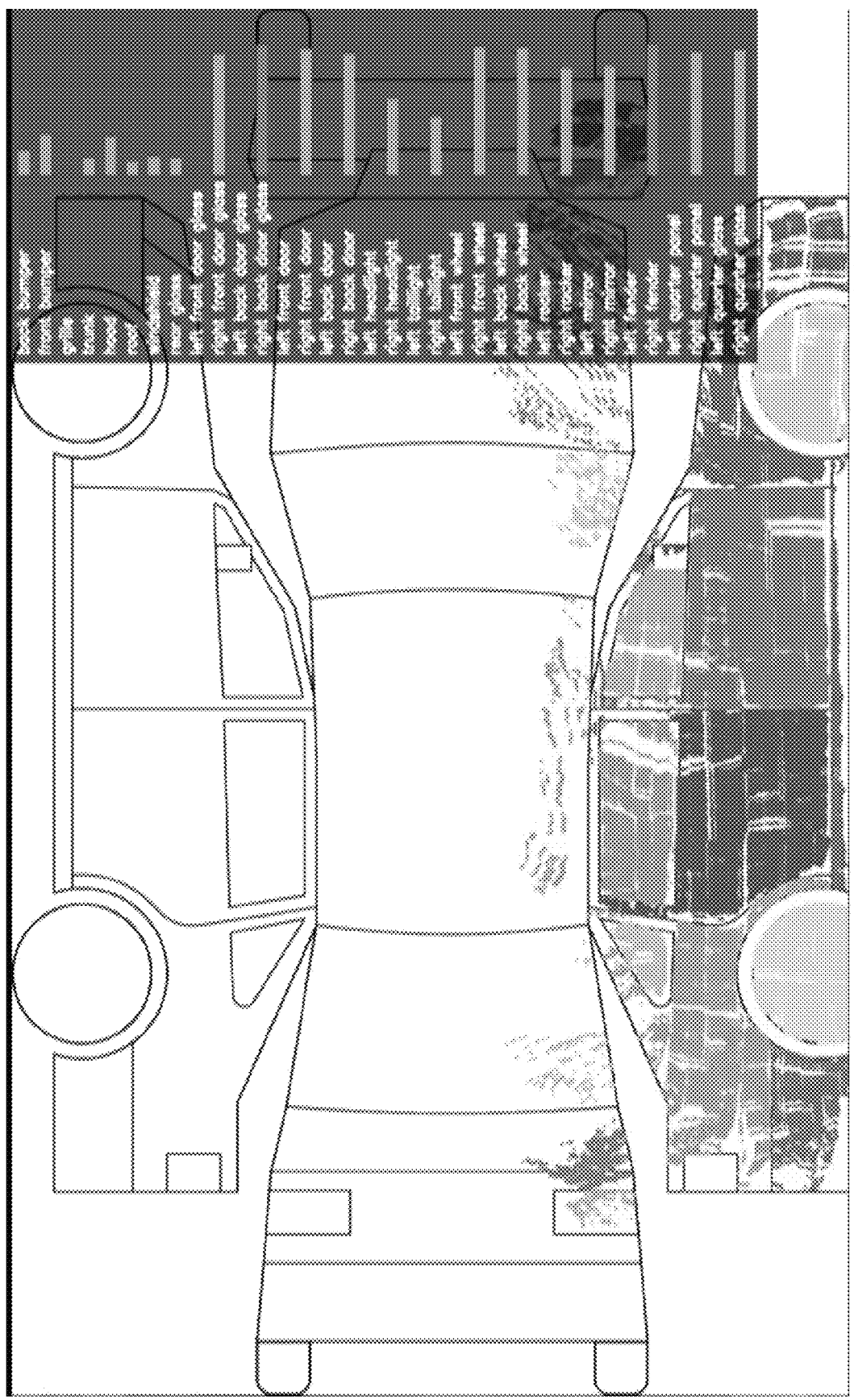

In FIG. 8, a top-down view corresponding to FIG. 7 is shown, with color, as it may appear in an actual user interface. The top-down view again shows different colors corresponding to different components of the vehicle that have been captured in the visual data. As in FIG. 6, only the right side of the vehicle has been captured in the visual data as of this time.

Figure 10:
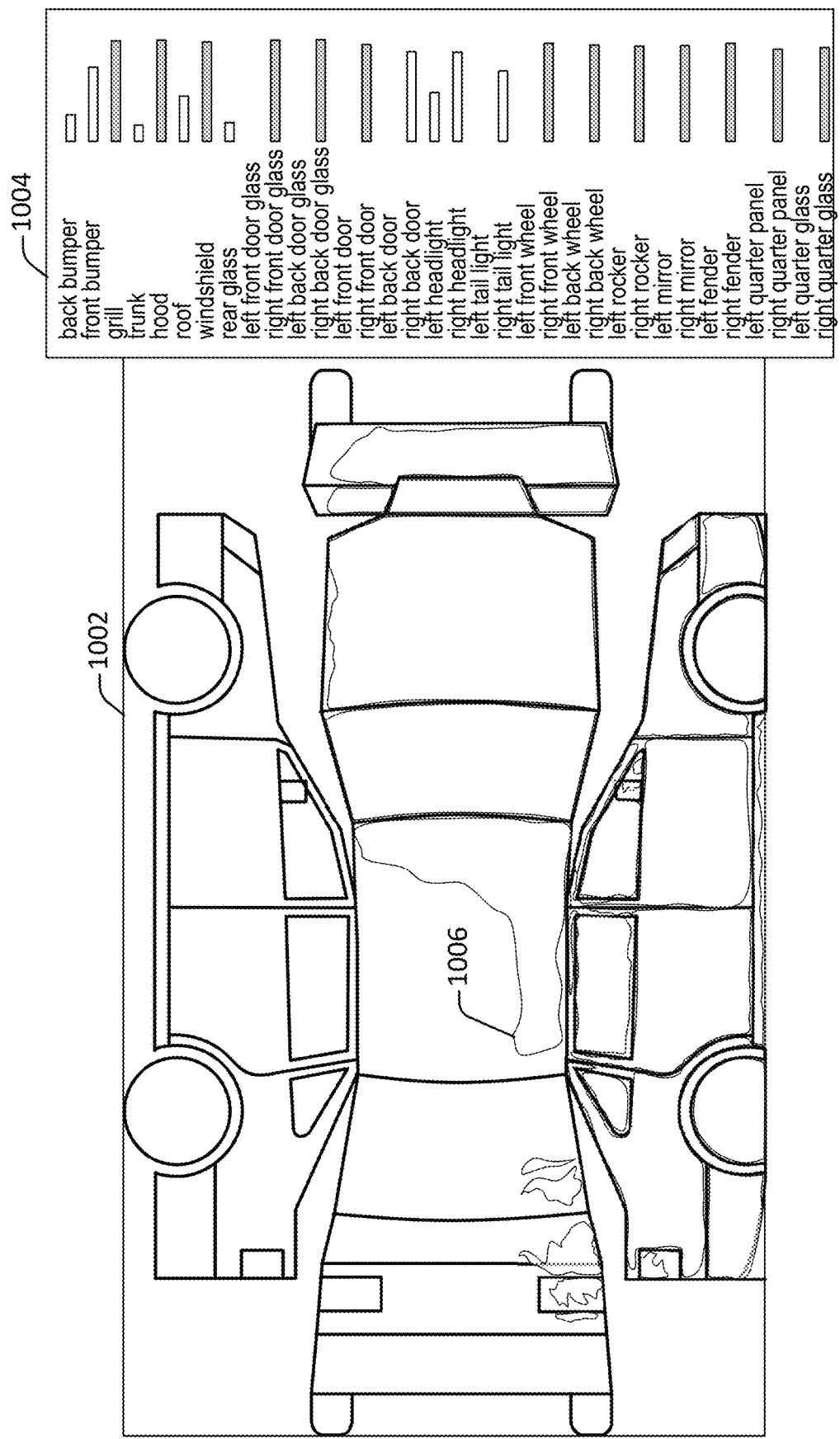
Figure 12:
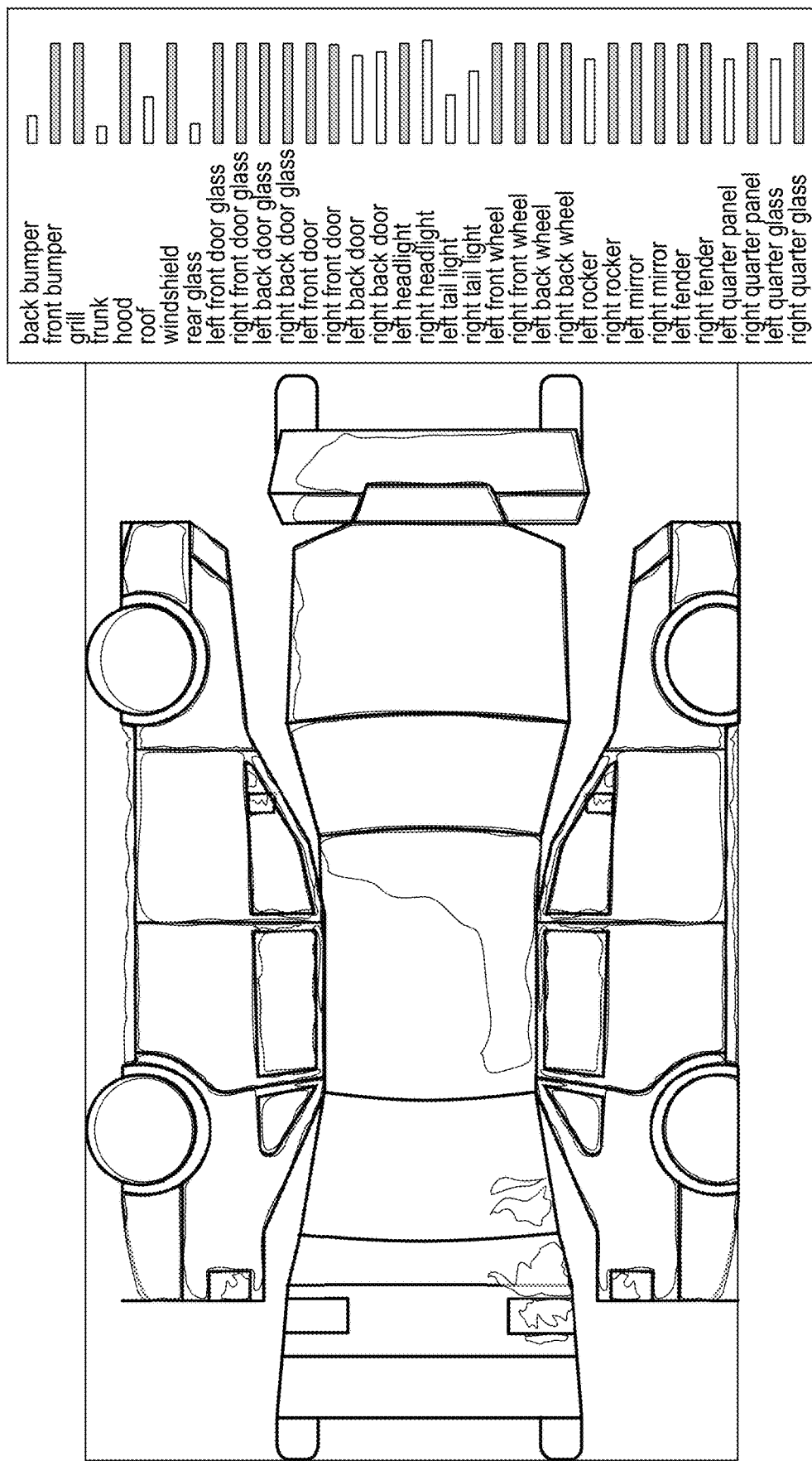
Figure 13:
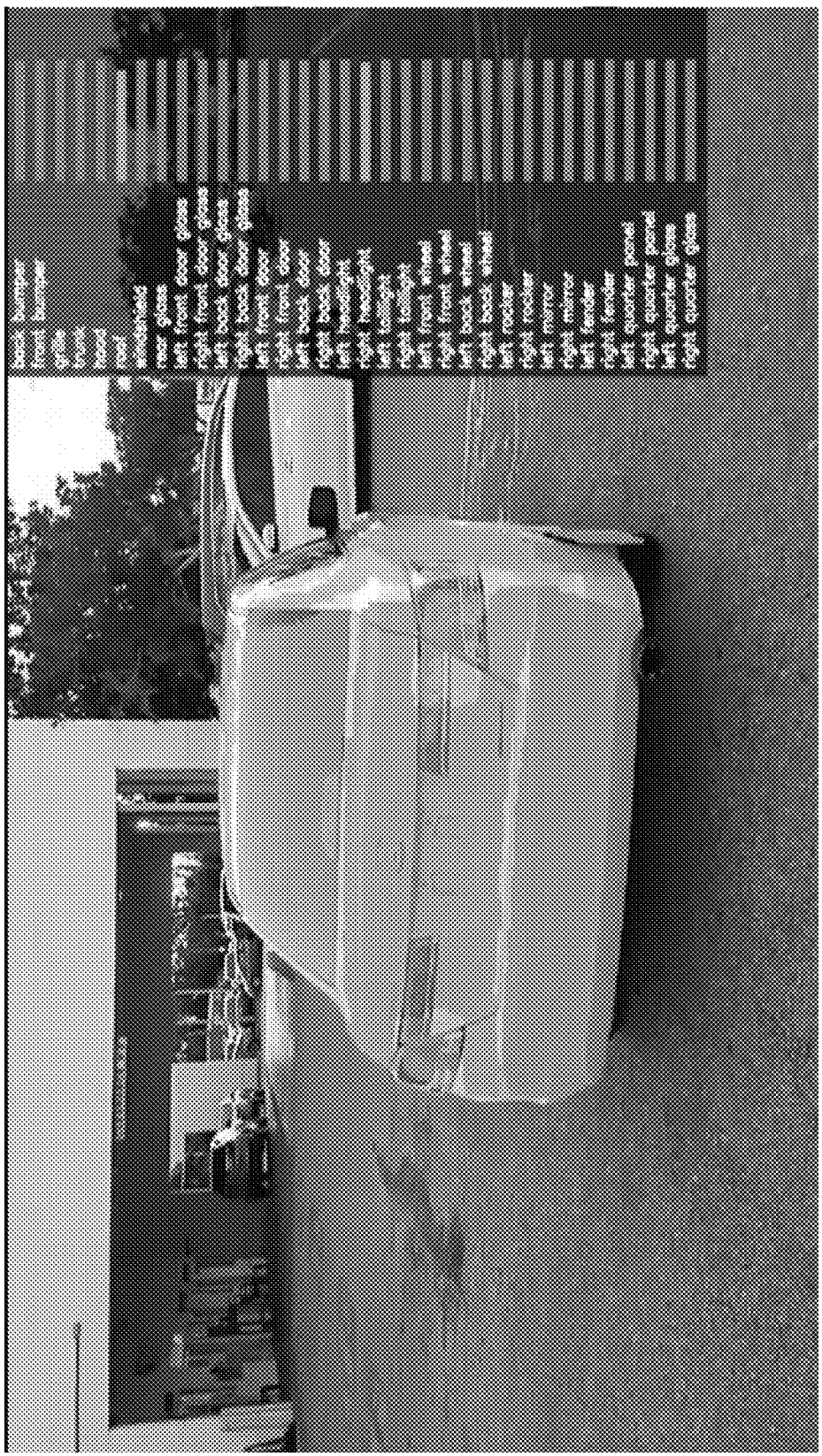
Figure 14:
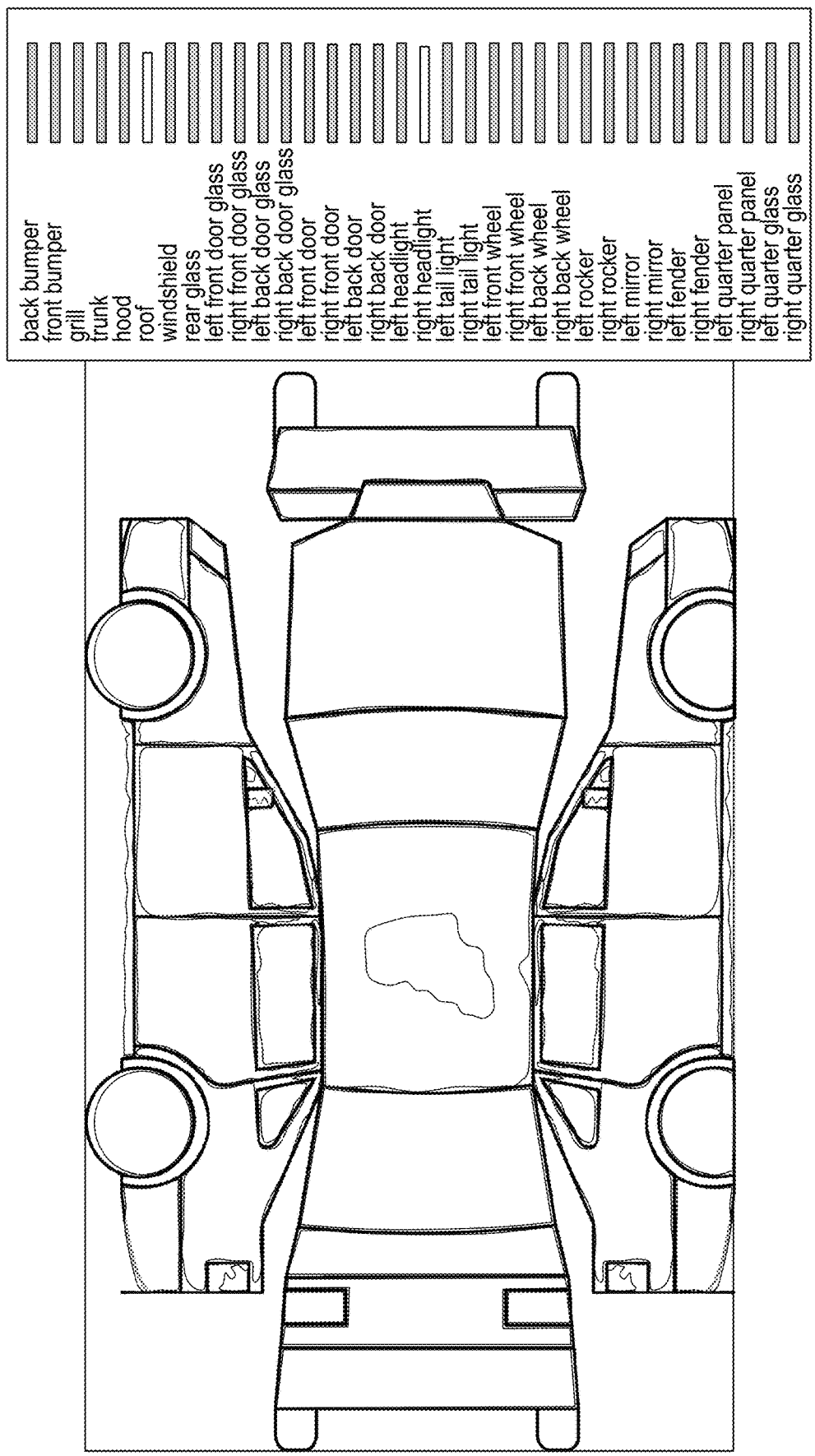

FIGS. 9, 11, and 13 show subsequent views as the camera has been moved around the vehicle first toward the front, then along the right side, and then at the back. FIGS. 10, 12, and 14 show the corresponding top-down views illustrating the portions of the vehicle that have been captured. By the time the image shown in FIG. 13 has been captured, nearly all components of the vehicle have been captured with a high degree of confidence, as shown in the status bars in FIGS. 13 and 14. In FIG. 10, an abstract top-down diagram is shown at 1002, with overlain regions such as 1006 illustrating captured areas. Coverage levels are then illustrated at 1004, with larger and shaded bars indicating higher levels. In FIGS. 12 and 14, coverage levels and overlain regions have increased due to the capture of additional images.

FIGS. 7, 9, 11, and 13 are particular images from a sequence of images captured as the camera is moved around the vehicle. Multi-view image data of a vehicle may include different or additional images. For instance, an image may be captured automatically at any suitable interval, such as once per second.

Figure 15:
Figure 16:
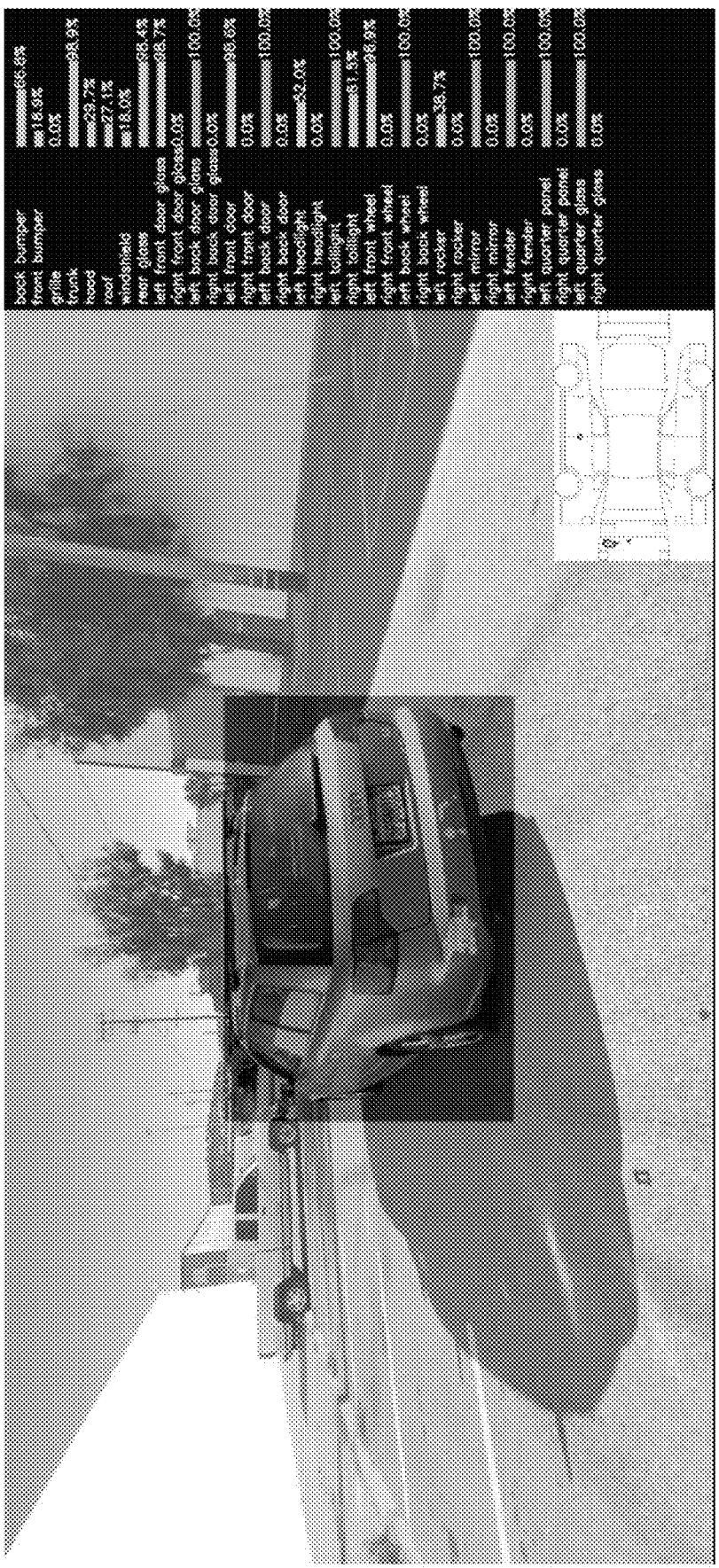
Figure 17:
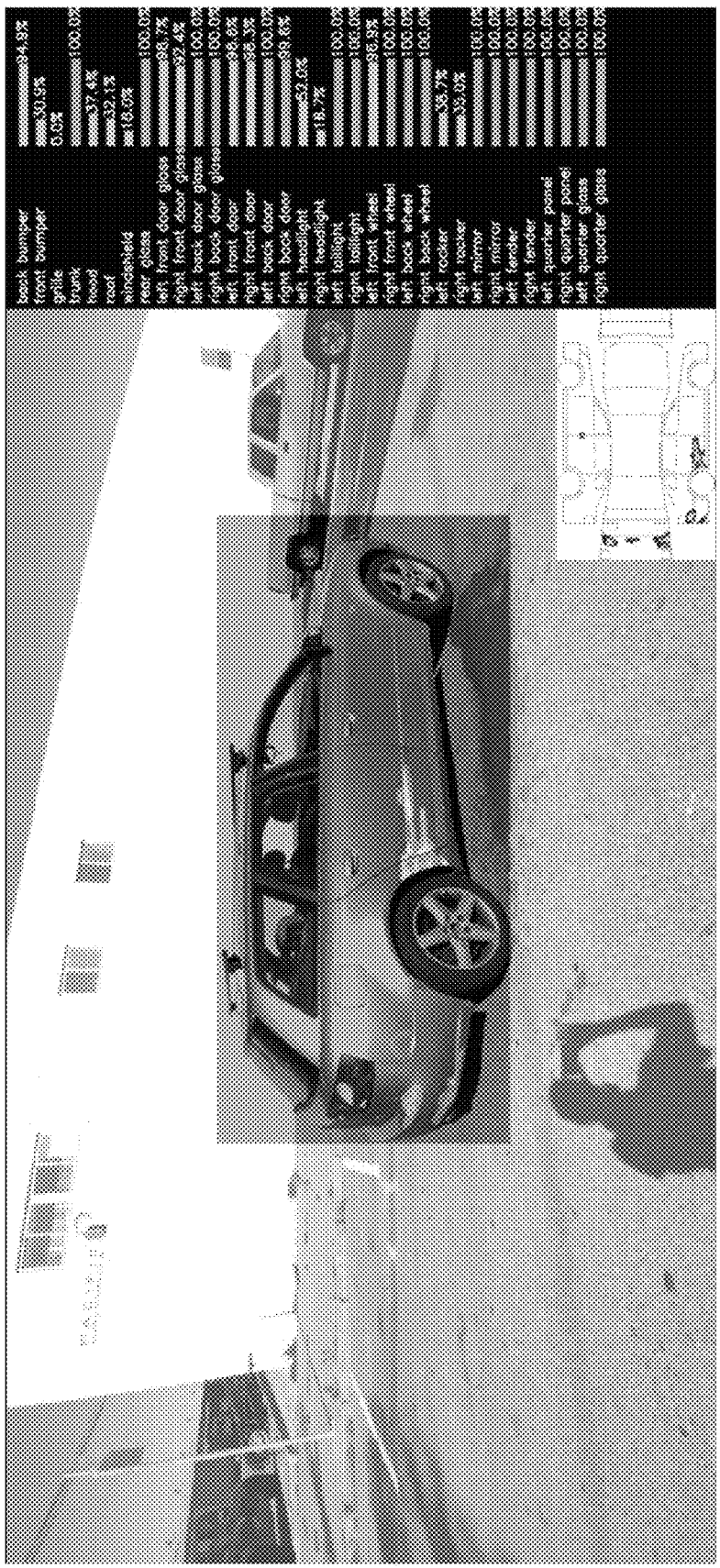
Figure 18:

FIGS. 15-16 illustrate a progression of images similar to those shown in FIGS. 7-14 around a different vehicle in a different user interface. In FIGS. 15-18, the top-down view is presented in the lower right of the Figure. In addition, the status bars include percentages illustrating a confidence level associated with the captured data.

In contrast to FIGS. 7-14, the inset top-down view in FIGS. 15-18 illustrates detected damage rather than image data coverage. For example, in FIG. 17, damage has been detected to the back and right sides of the vehicle. The detected damage is illustrated both on the top-down view as a heatmap and the image as overlain colored areas.

Figure 19:
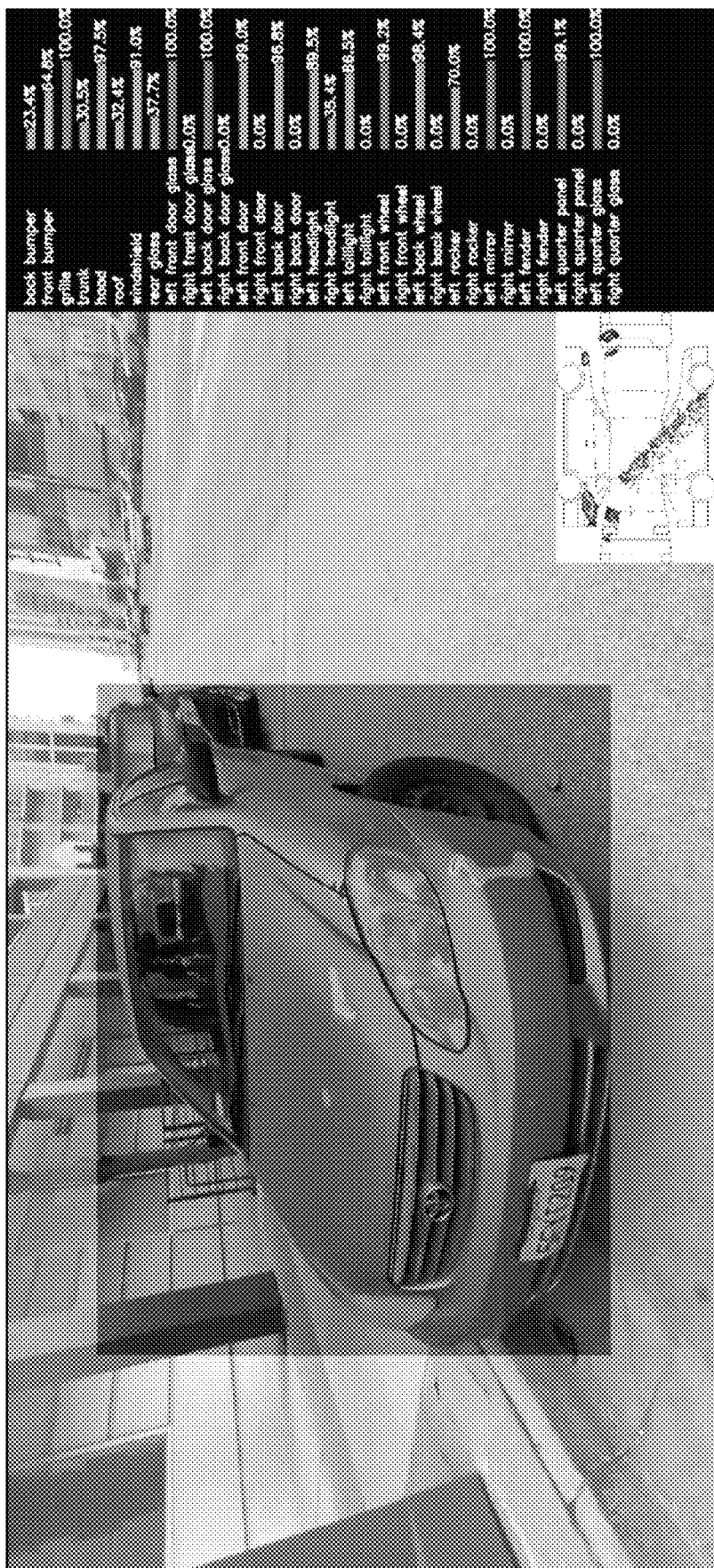
Figure 20:
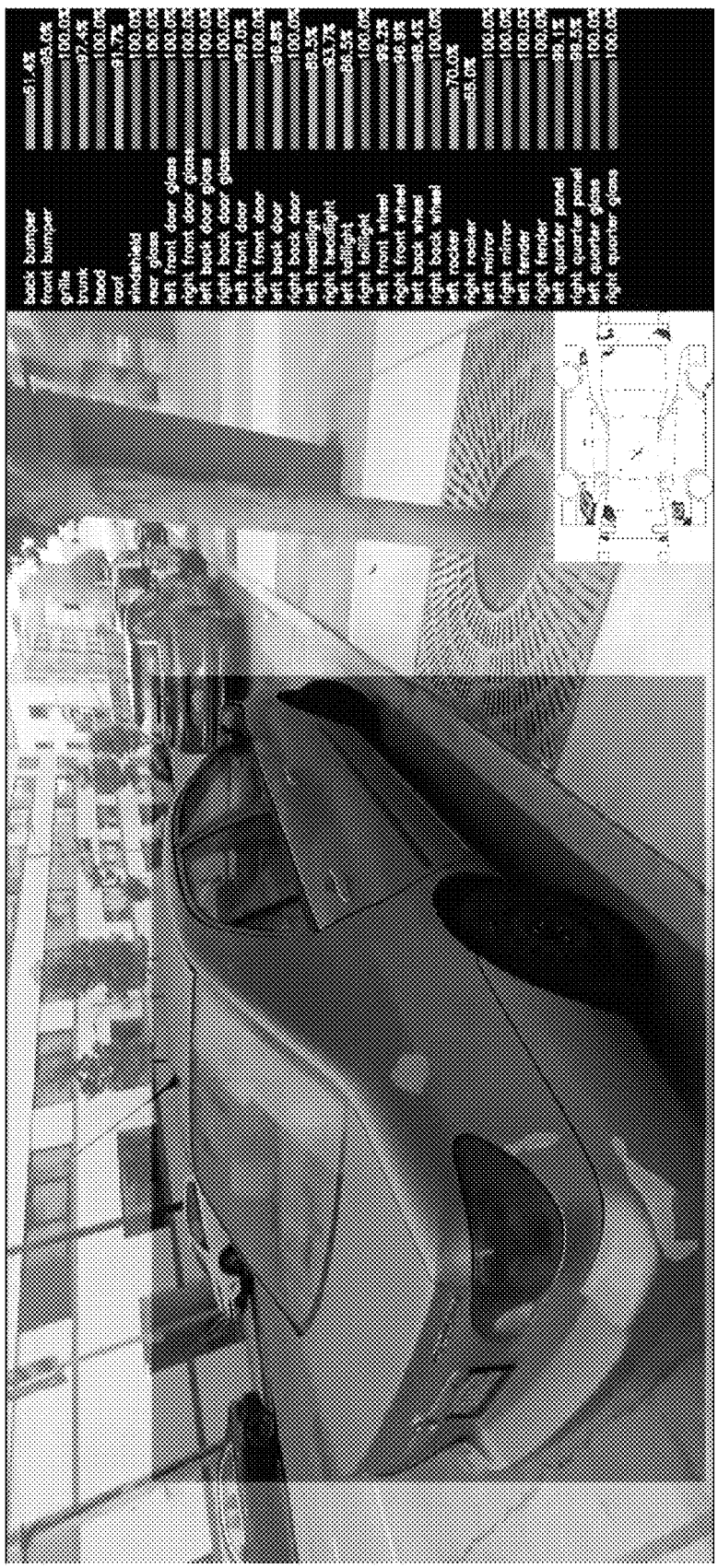

FIG. 19 and FIG. 20 illustrate a progression of images similar to those shown in FIGS. 15-18 around a different vehicle. As in FIGS. 15-18, confidence values for vehicle components increase as additional visual data is captured. Detected damage is shown on the inset heatmap.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:
1. A method comprising:
receiving a first set of images of an object captured via a camera, wherein a plurality of images in the first set of images are captured from different viewpoints;

identifying a plurality of object components associated with a vehicle based on the first set of images via a processor;

identifying a plurality of damage estimates estimating damage to a subset of the first plurality of object components based on the first set of images;

determining via the processor a plurality of capture coverage levels corresponding with the plurality of object components based on the first set of images;

depicting the identified damage for presentation on a display; and providing recording guidance for capturing a second set of images of the object to increase one or more of the capture coverage levels.

2. The method recited in claim 1, the method further comprising:

receiving the second set of images of the object; and updating one or more of the damage estimates based on the second set of images.

3. The method recited in claim 2, wherein the identified damage is updated for presentation on the display based on the updated damage estimates.

4. The method recited in claim 1, wherein the identified damage is depicted using a graphical user interface that includes a live camera view captured from the camera.

5. The method recited in claim 4, wherein the graphical user interface includes component segmentation information identifying some or all of the plurality of object components overlain on the live camera view.

6. The method recited in claim 5, wherein the component segmentation information includes areas of color corresponding with some or all of the plurality of object components.

7. The method recited in claim 4, wherein the graphical user interface includes an abstract diagram of the object having areas corresponding with some or all of the plurality of object components overlain on the live camera view.

8. The method recited in claim 7, wherein the graphical user interface includes component segmentation information identifying some or all of the plurality of object components overlain on the abstract diagram.

9. The method recited in claim 7, wherein the abstract diagram presents a flattened top-down view of the object.

10. The method recited in claim 1, wherein identifying the plurality of object components comprises applying a neural network to the one or more images.

11. The method recited in claim 1, wherein identifying the plurality of damage estimates comprises applying a neural network to the one or more images.

12. A system comprising:

an input interface configured to receive a first one or more images of an object captured via a camera, wherein a plurality of images in the first set of images are captured from different viewpoints;

a processor configured to identify a plurality of object components associated with a vehicle based on the first set of images via a processor, identify a plurality of damage estimates estimating damage to a subset of the first plurality of object components based on the first set of images, and determine via the processor a plurality of capture coverage levels corresponding with the plurality of object components based on the first set of images;

an output interface configured to send a depiction of the identified damage for presentation on a display and to provide recording guidance for capturing a second set of images of the object to increase one or more of the capture coverage levels.

13. The system recited in claim 12, wherein the second set of images of the object is received and one or more of the damage estimates is updated based on the second set of images.

14. The system recited in claim 13, wherein the identified damage is updated for presentation on the display based on the updated damage estimates.

15. The system recited in claim 12, wherein the identified damage is depicted using a graphical user interface that includes a live camera view captured from the camera.

16. The system recited in claim 15, wherein the graphical user interface includes component segmentation information identifying some or all of the plurality of object components overlain on the live camera view.

17. The system recited in claim 16, wherein the component segmentation information includes areas of color corresponding with some or all of the plurality of object components.

18. The system recited in claim 15, wherein the graphical user interface includes an abstract diagram of the object having areas corresponding with some or all of the plurality of object components overlain on the live camera view.

19. The system recited in claim 18, wherein the graphical user interface includes component segmentation information identifying some or all of the plurality of object components overlain on the abstract diagram.

20. A non-transitory computer readable medium comprising computer code for:

receiving a first one or more images of an object captured via a camera, wherein a plurality of images in the first set of images are captured from different viewpoints;

identifying a plurality of object components associated with a vehicle based on the first set of images via a processor;

identifying a plurality of damage estimates estimating damage to a subset of the first plurality of object components based on the first set of images;

determining via the processor a plurality of capture coverage levels corresponding with the plurality of object components based on the first set of images;

depicting the identified damage for presentation on a display; and providing recording guidance for capturing a second set of images of the object to increase one or more of the capture coverage levels.

* * * * *